United States Patent
Kikuchi et al.

(10) Patent No.: US 8,367,934 B2
(45) Date of Patent: Feb. 5, 2013

(54) INSULATING COATING COMPOSITION AND AN INSULATED WIRE, AND A COIL FORMED USING THE SAME

(75) Inventors: Hideyuki Kikuchi, Hitachi (JP); Yuji Takano, Mito (JP)

(73) Assignee: Hitachi Magnet Wire Corp., Ibaraki (JP)

( * ) Notice: Subject to any disclaimer, the term of this patent is extended or adjusted under 35 U.S.C. 154(b) by 0 days.

(21) Appl. No.: 13/284,345

(22) Filed: Oct. 28, 2011

(65) Prior Publication Data

US 2012/0043109 A1  Feb. 23, 2012

Related U.S. Application Data

(62) Division of application No. 12/719,523, filed on Mar. 8, 2010, now Pat. No. 8,247,071.

(30) Foreign Application Priority Data

Mar. 13, 2009  (JP) .................................. 2009-061044

(51) Int. Cl.
*H01B 7/00*  (2006.01)
(52) U.S. Cl. ................................. 174/121 SR
(58) Field of Classification Search ............ 336/65, 336/206–208, 210; 174/121 SR, 110 SR
See application file for complete search history.

(56) References Cited

U.S. PATENT DOCUMENTS

| | | | | |
|---|---|---|---|---|
| 2,995,531 A | * | 8/1961 | Hudson | 524/300 |
| 3,105,775 A | * | 10/1963 | Lavin et al. | 428/380 |
| 3,428,486 A | * | 2/1969 | George | 428/383 |
| 3,501,425 A | | 3/1970 | Delius | |
| 3,516,858 A | * | 6/1970 | Fitzhugh et al. | 428/383 |
| 3,634,301 A | * | 1/1972 | Fitzhugh et al. | 523/461 |
| 4,508,779 A | * | 4/1985 | Miyake et al. | 428/383 |
| 5,358,786 A | * | 10/1994 | Ishikawa et al. | 428/380 |
| 5,521,009 A | * | 5/1996 | Ishikawa et al. | 428/375 |
| 6,534,717 B2 | | 3/2003 | Suzuki et al. | |

FOREIGN PATENT DOCUMENTS

| | | | |
|---|---|---|---|
| JP | 04012405 A | * | 1/1992 |
| JP | 09-045143 | | 2/1997 |
| JP | 2002-075066 | | 2/2002 |
| JP | 2007-213908 | | 8/2007 |

* cited by examiner

*Primary Examiner* — Tuyen Nguyen
(74) *Attorney, Agent, or Firm* — Brundidge & Stanger, P.C.

(57) ABSTRACT

An insulating coating composition that improves lubricity without reduction of the varnish adhesion strength and an insulated wire using the insulating coating composition, and a coil using the insulated wire are provided. An insulating coating composition comprises a polyamide-imide resin, which is obtained through a synthetic reaction of isocyanate component with acid component, and a lubricant component, wherein the terminal isocyanate group of the polyamide-imide resin is capped with a blocking agent of higher alcohol having a carbon number of eight or more.

5 Claims, 1 Drawing Sheet

US 8,367,934 B2

INSULATING COATING COMPOSITION AND AN INSULATED WIRE, AND A COIL FORMED USING THE SAME

This application is a divisional application of U.S. patent application Ser. No. 12/719,523, filed Mar. 8, 2010, which is incorporated by reference herein in its entirety.

TECHNICAL FIELD

The present invention relates to an insulating coating composition that uses polyamide-imide resin as its base resin and an insulated wire and relates to a coil formed using the insulated wire.

BACKGROUND ART

Motors and transformers are fabricated undergoing such a process for example as is comprised of the process of inserting a plurality of coils, each of which is formed by winding an insulated wire (enamel wire), into stator slots and then splicing mutually the ends of the plurality of inserted coils by welding or other similar method.

In forming a coil, the insulated wire is wound at a high-speed. Since the high-speed winding in a coil forming process damages the insulated wire leaving scratches on the surface thereof, an insulated wire having excellent coiling properties is required for reduction of such scratches. This means that such an insulated wire as has an improved surface lubricity (self-lubricity) is desired.

There are known methods for improving the surface lubricity of an insulated wire. One of the known methods is applying lubricant on the insulated wire, wherein the major constituent of the lubricant is paraffin, fatty acid ester, or other similar substance. Typical another known method is forming a lubricative layer on the insulated wire. The layer is formed by applying-and-baking insulating coating composition having lubricity on the conductor of the wire, wherein the insulating coating composition is prepared by adding a lubricant, which is similar lubricant to the above-sated composition, to the base resin of the insulating coating composition.

Further another known method is forming a lubricative layer on the insulated wire; the layer is formed by applying-and-baking insulating coating composition having lubricity on the conductor of the wire, wherein the insulating coating composition is prepared by compounding stabilized isocyanate and lubricant into the base resin of the insulating coating composition. (Refer to JP 09-45143 A for example.)

Coils, after being formed by winding insulated wire, are impregnated with varnish, which is then cured to increase mechanical strength and insulating properties. In a coil that uses an insulated wire having a lubricative layer on its outermost surface, the lubricative layer works as a disincentive factor against the adhesion strength (varnish adhesion strength) between the varnish and the coil. Therefore, the varnish adhesion strength in such coil is very low compared with a coil that uses an insulated wire without lubricative layer.

A method of improving this reduction problem of the varnish adhesion strength is the adding of such a composition as is reactive with the varnish to be used for coil impregnation-and-curing (treatment varnish) to the insulating coating composition having lubricity; such reactive substance includes for example epoxy resin, silane coupling agent, and other similar substance. (Refer to JP 2002-75066 A and JP 2007-213908 A for example.)

SUMMARY OF INVENTION

Recent years, motors and transformers has been demanded to have high efficiency from the viewpoint of energy saving. As a response to this demand, the coil for such apparatus is inserted in the stator slot closely with almost no interstices for increased ratio of the cross-sectional area of the conductor of the coil to the cross-sectional area of the stator slot (a space factor) more than that of in the conventional practice.

To reduce surface scratches on the insulating layer that occur in coil insertion in this manner, the insulated wire is required to have an excellent insertion properties, which means that the insertion force (coil insertion force) needed to insert the coil into the stator slot should be reduced more. It is therefore necessary to improve the surface lubricity of the insulated wire more than ever before to meet this demand.

Improvement of the surface lubricity of the insulted wire more than ever tends to cause a accompanying past problem of the reduction in the vanish adhesion. However, a method of improving low varnish adhesion strength within the conventional practice cannot achieve an enough effect to prevent the reduction of the varnish adhesion strength.

Under these circumstances, the purpose of the present invention is to provide an insulating coating composition that improves lubricity without reduction of the varnish adhesion strength and an insulated wire using the insulating coating composition and a coil using the insulated wire.

MEANS FOR SOLVING THE PROBLEMS

To accomplish above-stated purpose, the invention defined in claim 1 provides an insulating coating composition comprised of a polyamide-imide resin, which is obtained by a synthetic reaction of isocyanate component with acid component, and a lubricant component, wherein the terminal isocyanate group of the polyamide-imide resin is capped with a blocking agent of higher alcohol having a carbon number of eight or more.

The invention defined in claim 2 provides the insulating coating composition according to claim 1, wherein the polyamide-imide resin is obtained by a synthetic reaction of the isocyanate component with the acid component in a molar ratio of equimolar amount or in a molar ratio in which the molar amount of the isocyanate component is in excess of the molar amount of the acid component.

The invention defined in claim 3 provides the insulating coating composition according to claim 1 or claim 2, wherein the blocking agent is added in a molar amount within the range from not less than 0.3 mol % to less than 5 mol % of the molar amount of the isocyanate component.

The invention defined in claim 4 provides an insulated wire having a lubricative layer formed by applying the insulating coating composition according to any one of claims 1 to 3 on the periphery of the conductor of wire.

The invention defined in claim 5 provides the insulated wire according to claim 4, wherein the surface of the lubricative layer has a pit having diameters of not smaller than 0.1 μm but not larger than 5 μm.

The invention defined in claim 6 provides a coil formed winding the insulated wire according to claim 4 or claim 5, wherein the surface of the coil is impregnated with varnish and then the varnish is cured.

According to the present invention, an insulating coating composition capable of improving the lubricity of an insulating coating without lowering the varnish adhesion strength thereof and an insulated wire using the insulating coating composition, and a coil formed using the insulated wire can be provided.

DESCRIPTION OF EMBODIMENTS

Figure 1:
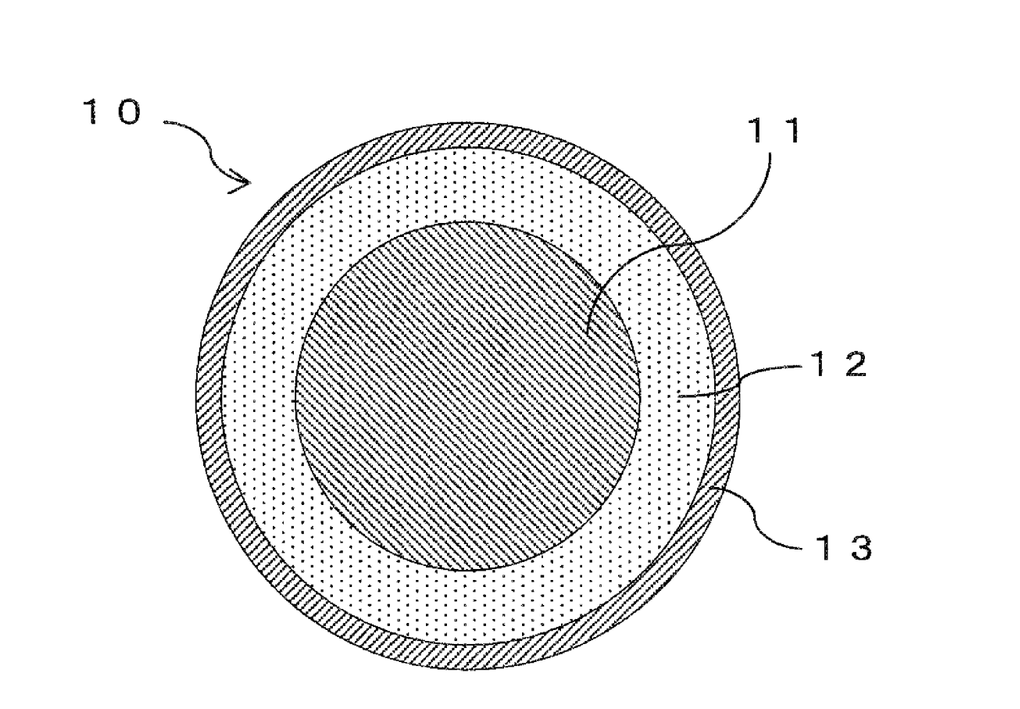
FIG. 1 is the cross-section of an example of embodiments of the present invention.

The following details a preferred example of embodiments referring to the attached drawing.

At first, an insulated wire to which the present invention is applied is explained referring to FIG. 1.

An insulated wire 10 is obtained by applying a general-purpose insulating coating enamel on a conductor 11 and baking the applied enamel to form an insulating layer 12 on the periphery of the conductor 11; and further applying an insulating coating composition by the present invention thereon followed by baking to form a lubricative layer 13.

The insulated wire 10 may be formed by applying the insulating coating composition by the present invention directly on the conductor 11 followed by baking to provide the lubricative layer 13.

Next, the self-lubricating insulating coating composition, which is comprised of polyamide-imide resin forming the lubricative layer 13, will be explained.

In this embodiment, the base resin of the self-lubricating insulating coating composition is comprised of polyamide-imide resin, which is obtained as follows. In the stage where isocyanate component and acid component are allowed to proceed to a synthetic reaction to obtain the insulating coating composition comprised of polyamide-imide resin, higher alcohol having a carbon number of eight or more is charged into the synthetic reaction system as a blocking agent for capping isocyanate group of the terminal group of the polyamide-imide resin to cease the synthetic reaction at the timing when properties of the insulating coating composition reach suitable state for enameling in viscosity, resin component concentration, molecular weight, and other particulars.

Thereby, an insulated wire (self-lubricating enamel wire) having strong varnish adhesion strength rendered by an anchoring effect is obtained despite the lubricity being improved because using this insulating coating composition forms minute pits on the surface of the insulated wire when forming the lubricative layer. The anchoring effect is called also the anchor effect, wherein adhesive or bonding material embeds in the minute pits on an object to be adhered and cures as it is working as wedges with the adhesion strength enhanced. This mechanism is a great contribution to the improvement of the varnish adhesion strength.

The insulating coating composition employed in the present invention comprised of polyamide-imide resin is an insulating coating composition obtained by a synthetic reaction allowed between two reactants mainly of isocyanate component comprised of such as 4,4'-diphenylmethane diisocyanate (MDI) and acid component comprised of such as trimellitic anhydride (TMA) using polar solvent such as N-methyl-2-pyrrolidone (NMP) as the prime solvent. This synthetic reaction uses higher alcohol having a carbon number of eight or more as a blocking agent to cease the synthetic reaction.

When the carbon number of a higher alcohol is eight or more, the anchoring effect works with the varnish adhesion strength increased. However, a carbon number between 15 and 30 is preferable in that the sizes, depths, numbers, and other particulars of created pits rendered by such carbon number are the most suitable for the purpose.

As the higher alcohol having a carbon number of eight or more, alcohol typically such as stearyl alcohol (carbon number 18) and oleyl alcohol (carbon number 18) are preferable. Among such preferable alcohols, unsaturated alcohols are more preferable because of easiness in handling as the blocking agent since most of them are liquid. Further, polyethylene glycol (molecular weight 600 or more), polypropylene glycol, and other similar substance are also applicable since they are rich in variety of molecular weights, numbers of branches, and other features. Still further, alcohol having a structure in which alcohol is added to ring structure such as alicyclic or aromatic ring is acceptable. These higher alcohols may be used in combination with lower alcohol.

In the insulating coating composition comprised of polyamide-imide resin using isocyanate component comprising MDI or similar substance and acid component comprising TMA or similar substance, the isocyanate component and the acid component are allowed to proceed to a synthetic reaction in approximately equal molar amount of compounding ratio. In certain case however, the isocyanate component may be put in the synthetic reaction in a larger amount within a range from 1 to 1.05 times the molar amount of the acid component.

In that case, the higher alcohol as a blocking agent is added in a molar amount enough to cap the isocyanate group in the isocyanate component. For example, a molar amount that can cap all the isocyanate groups in the isocyanate component is practicable; or instead, a molar amount that is larger or smaller than the amount of the isocyanate group in the isocyanate component is acceptable. Preferably, the blocking agent should be added in a molar amount within the range from not less than 0.3 mol % to less than 5 mol % of the molar amount of the isocyanate component. More preferably, the molar amount of the blocking agent is within the range from not less than 0.3 mol % to not more than 2 mol % of the molar amount of the isocyanate component.

Thereby, while the insulating coating composition is baked and cured in the stage of forming lubricative layer, the blocking agent dissociates and becomes to have more higher molecular weight forming the lubricative layer. Thus, the insulating coating earns good lubricity and tight varnish adhesion strength.

The state of surface of the insulated wire, i.e., the size of the pits formed on the surface of the lubricative layer, has a tendency to be dependent on the type and compounding amount of the higher alcohol. However, the size varies according to the balance of compounding ratio among various materials, the molecular weight of resin, additives, and other particulars. As described above therefore, the most suitable amount of the higher alcohol needs to be determined within such a range that good lubricity and strong varnish adhesion strength will be obtained.

As stated above, making the adding amount (molar amount) of the higher alcohol having a carbon number of eight or more be within the range from not less than 0.3 mol % to less than 5 mol % of the adding amount (molar amount) of MDI causes the diameters of the pits formed on the surface (the surface of the lubricative layer) of the insulated wire to fall within the range from 0.1 to 5 μm. If the diameter of the pit is in excess of 5 μm, slipping properties and abrasion resistance become poor, that is, the lubricity behaves toward low although the varnish adhesion strength is improved. Where the diameter is below 0.1 μm, the improvement effect in the varnish adhesion strength will reduce. Therefore, it is desirable to add the higher alcohol in such an amount that the pit diameters will fall within the range from 0.1 to 5 μm, preferably 0.1 to 3 μm. The diameter of the pit is represented by an arithmetic average of diameters of pits measured by observing the reference surface under a light microscope, wherein the reference surface is the surface (the surface of the lubricative layer) of the insulated wire.

There are no particular limitations on raw materials, composition of solvent, molecular weight, viscosity, concentration, or other particulars for the polyamide-imide resin coating composition. As the raw material, isocyanate component such as tolylene diisocyanate (TDI), an existing material other than MDI, may be used in combination therewith. As the acid component, an existing tricarboxylic anhydride such as trimellitic anhydride (TMA), tetracarboxylic dianhydride such as pyromellitic dianhydride (PMDA), or dicarboxylic acids such as terephthalic acid (TDA) may be used in combination therewith.

As the solvent, NMP or existing polar solvents other than NMP suitable for synthesizing polyamide-imide resin may be used; such suitable solvent may be used in combination with NMP. Alternatively, any other solvents may be used as long as they will not affect the properties. Catalysts for reaction such as amines, imidazoles, imidazolines, and other similar substance may be employed. However, such a catalyst as does not affect the properties is preferred.

As the additive to provide the insulating coating composition with the lubricity, lubricant such as polyolefin series substance or fatty acid ester series substance is used. Although there are no particular limitations on types or adding amounts of the lubricant, the preferred adding amount of the polyethylene series lubricant is about 1 to 4 parts by mass in terms of the amount of the polyamide-imide resin.

To boost the bleeding of lubricant, materials such as polyisocyanate compound, stabilized isocyanate, epoxy resin, phenol resin, or other similar material may be used in combination therewith. Here, the stabilized isocyanate means that all of the terminal isocyanate group is capped and stabilized with a blocking agent, while the isocyanate compound means that all or only part of the terminal isocyanate group is uncapped with the blocking agent.

Further, as the additives, dispersant, anti oxidant, coupling agent, leveling agent, or other similar additives may be used in combination therewith.

There are no particular limitations on aspects of lubricant dispersion. Charging a proper amount of the lubricant directly into the insulating coating composition comprised of polyamide-imide resin followed by a strong agitation with a mill or a similar device may be practicable. Charging a dispersion liquid, in which the lubricant is dispersed in organic solvent or similar substance in advance, in the insulating coating composition comprised of polyamide-imide resin and agitating to improve dispersion properties or other properties may be acceptable.

The construction of the insulated wire having lubricity has such a lubricating layer as is provided by the process in which above-stated insulating coating composition comprised of polyamide-imide resin is applied and baked on the insulating layer comprised of a general-purpose enamel insulating coating composition. Regarding this construction, there are no particular limitations on coating thickness of the insulating layer or the lubricative layer, on the ratio of the coating thickness of insulating layer to the lubricative layer, or other particulars.

There are no limitations on type of the insulating layer comprised of a general-purpose enamel insulating coating composition, or on number of layers defined by difference in the type of each of the insulating layers. For the average use however, the number of insulating layers is preferred to be one or two. Further, it is practicable to apply lubricating oil or solid lubricant on the surface of lubricative layer.

EMBODIMENT EXAMPLES

Embodiment examples and comparison examples are prepared and examined as follows.

Raw materials listed in the descriptions for the embodiment examples and the comparison examples given below were charged in a flask provided with an agitator, a reflux cooling tube, a nitrogen gas supplying tube, and a thermometer. Charged raw materials were agitated in nitrogen atmosphere being heated to reach 140° C. in about one hour and allowed to react with each other for two hours at that temperature. On completion of the two-hour reaction, the reaction was terminated using a blocking agent listed in the descriptions for the embodiment examples and the comparison examples so that a solution of the polyamide-imide resin having a reduced viscosity of about 0.4 dl/g would be obtained. Thus, the polyamide-imide resin to be used as the base resin for coating composition is obtained.

And then, into the 100 parts by mass of the polyamide-imide resin, lubricant component, additives, and additive resin were charged and agitated to prepare an insulating coating composition having self-lubricity comprised of polyamide-imide resin (hereinafter referred to as the self-lubricating polyamide-imide resin insulating coating material).

As explained in the previous description referring to FIG. 1, the insulated wire (self-lubricating enamel wire) 10 was obtained in the following manner: after applying-and-baking the general-purpose polyamide-imide resin on the copper conductor 11 having a diameter of 1.0 mm to form the insulating layer 12 thereon having a coating thickness of 30 μm, the self-lubricating polyamide-imide resin insulating coating composition was applied thereon and baked to form the lubricative layer 13 of the self-lubricating polyamide-imide having the coating thickness of 3 μm.

Table 1 and Table 2 show properties and characteristics of the enamel wires of the embodiment examples and comparison examples.

TABLE 1

| | | | Embodiment Example 1 | Embodiment Example 2 | Embodiment Example 3 | Embodiment Example 4 | Embodiment Example 5 | Embodiment Example 6 | Embodiment Example 7 |
|---|---|---|---|---|---|---|---|---|---|
| Raw materials for insulating | Isocyanate component | 4,4'-MDI (Mw = 250) 2,4-TDI (Mw = 174) | 255.0 (1.02) | 255.0 (1.02) | 255.0 (1.02) | 262.5 (1.05) | 250.0 (1.00) | 255.0 (1.02) | 255.0 (1.02) |

TABLE 1-continued

|  |  |  |  |  |  |  |  |  |
|---|---|---|---|---|---|---|---|---|
| coating composition of polyamide-imide resin | Tricarboxylic anhydride | TMA (Mw = 192) | 192.0 (1.00) | 192.0 (1.00) | 192.0 (1.00) | 192.0 (1.00) | 192.0 (1.00) | 192.0 (1.00) | 192.0 (1.00) |
|  | Tetracarboxylic dianhydride | PMDA (Mw = 218) |  |  |  |  |  |  |  |
|  | Dicarboxylic acid component | TPA (Mw = 166) |  |  |  |  |  |  |  |
|  | Blocking agent | Oleyl alcohol (C18) (Mw = 268) | 5.4 (0.02) | 13.4 (0.05) | 0.8 (0.003) | 5.4 (0.02) | 5.4 (0.02) | 5.4 (0.02) | 5.4 (0.02) |
|  |  | Stearyl alcohol (C18) (Mw = 270) |  |  |  |  |  |  |  |
|  |  | Dodecanol (C12) (Mw = 186) |  |  |  |  |  |  |  |
|  |  | Octanol (C8) (MW = 130) |  |  |  |  |  |  |  |
|  |  | Polyethylene glycol 600 (Mw = 600) |  |  |  |  |  |  |  |
|  |  | Methanol (C1) (Mw = 32) |  |  | 0.3 (0.01) |  |  |  |  |
|  |  | Hexanol (C6) (Mw = 102) |  |  |  |  |  |  | 5.1 (0.05) |
|  |  | Butanone oxime (C4) (Mw = 87) |  |  |  |  |  |  |  |
| Lubricant component | Lubricant | Polyolefin series | 8.9 | 8.9 | 8.9 | 9.1 | 8.8 | 8.9 | 11.2 |
|  |  | Fatty acid ester series |  |  |  |  |  |  |  |
|  | Additive | Polyisocyanate compound |  |  |  |  |  |  | 111.8 |
|  |  | Epoxy resin |  |  |  |  |  |  |  |
|  |  | Silane coupling agent |  |  |  |  |  |  |  |
| Solvent |  | NMP | 1100 | 1100 | 1100 | 1100 | 1100 | 1200 | 1200 |
|  |  | DMF |  |  |  |  |  | 200 | 200 |
| Property of insulating coating composition |  | Reduced viscosity (dl/g) | 0.40 | 0.41 | 0.40 | 0.40 | 0.40 | 0.50 | 0.40 |
|  |  | Nonvolatile matter (mass %) | 28.3 | 28.2 | 28.0 | 28.1 | 28.1 | 24.1 | 28.4 |
| Property of insulated wire | Dimensions (mm) | Conductor diameter | 1.000 | 1.000 | 1.000 | 1.000 | 1.000 | 1.000 | 1.000 |
|  |  | Coating thickness | 0.033 | 0.033 | 0.034 | 0.034 | 0.034 | 0.034 | 0.034 |
|  |  | Finished wire external diameter | 1.066 | 1.065 | 1.067 | 1.067 | 1.067 | 1.067 | 1.067 |
|  | External appearance |  | Good | Good | Good | Good | Good | Good | Good |
|  | Average diameter of pits on surface (μm) |  | 2.0 | 4.8 | 1.0 | 2.3 | 1.9 | 1.1 | 1.1 |
|  | Abrasion resistance | Number of reciprocative abrasions (Cycle) | 1456 | 1250 | 1470 | 1390 | 1385 | 1330 | 1840 |
|  | Slipping property | Static friction coefficient | 0.051 | 0.050 | 0.051 | 0.050 | 0.051 | 0.053 | 0.049 |
|  | Varnish adhesion strength (N) | Epoxy series | 164 | 180 | 131 | 170 | 161 | 136 | 125 |
|  |  | Polyester series | 93 | 107 | 74 | 95 | 90 | 77 | 70 |
|  |  |  | Embodiment Example 8 | Embodiment Example 9 | Embodiment Example 10 | Embodiment Example 11 | Embodiment Example 12 | Embodiment Example 13 | Embodiment Example 14 |
| Raw materials for insulating composition of polyamide-imide resin | Isocyanate component | 4,4'-MDI (Mw = 250) | 255.0 (1.02) | 255.0 (1.02) | 230.0 (0.92) | 255.0 (1.02) | 255.0 (1.02) | 255.0 (1.02) | 255.0 (1.02) |
|  |  | 2,4-TDI (Mw = 174) |  |  | 17.4 (0.10) |  |  |  |  |
|  | Tricarboxylic anhydride | TMA (Mw = 192) | 192.0 (1.00) | 192.0 (1.00) | 172.8 (0.90) | 192.0 (1.00) | 192.0 (1.00) | 192.0 (1.00) | 192.0 (1.00) |
|  | Tetracarboxylic dianhydride | PMDA (Mw = 218) |  |  | 10.9 (0.05) |  |  |  |  |
|  | Dicarboxylic acid component | TPA (Mw = 166) |  |  | 8.3 (0.05) |  |  |  |  |
|  | Blocking agent | Oleyl alcohol (C18) (Mw = 268) | 5.4 (0.02) | 5.4 (0.02) | 5.4 (0.02) |  |  |  |  |
|  |  | Stearyl alcohol (C18) (Mw = 270) |  |  |  |  | 5.4 (0.02) |  |  |
|  |  | Dodecanol (C12) |  |  |  |  |  | 3.7 |  |

TABLE 1-continued

|  |  |  |  |  |  |  |  |  |
|---|---|---|---|---|---|---|---|---|
|  |  | (Mw = 186) |  |  |  |  | (0.02) |  |
|  |  | Octanol (C8) (Mw = 130) |  |  |  |  |  | 2.6 (0.02) |
|  |  | Polyethylene glycol 600 (Mw = 600) |  |  |  |  |  | 12.0 (0.02) |
|  |  | Methanol (C1) (Mw = 32) |  |  |  |  |  |  |
|  |  | Hexanol (C6) (Mw = 102) |  |  |  |  |  |  |
|  |  | Butanone oxime (C4) (Mw = 87) |  |  |  |  |  |  |
| Lubricant component | Lubricant | Polyolefin series | 8.9 |  | 8.8 | 8.9 | 8.9 | 8.9 | 8.9 |
|  |  | Fatty acid ester series |  | 8.9 |  |  |  |  |  |
|  |  | Polyisocyanate compound |  |  |  |  |  |  |  |
|  | Additive | Epoxy resin | 44.7 |  |  |  |  |  |  |
|  |  | Silane coupling agent |  |  |  |  |  |  |  |
| Solvent |  | NMP | 1000 | 900 | 900 | 900 | 900 | 900 | 900 |
|  |  | DMF | 250 | 200 | 200 | 200 | 200 | 200 | 200 |
| Property of insulating coating composition |  | Reduced viscosity (dl/g) | 0.40 | 0.40 | 0.41 | 0.41 | 0.41 | 0.40 | 0.39 |
|  |  | Nonvolatile matter (mass %) | 28.1 | 28.8 | 28.4 | 28.8 | 28.8 | 28.8 | 28.8 |
|  | Dimensions (mm) | Conductor diameter | 1.000 | 1.000 | 1.000 | 1.000 | 1.000 | 1.000 | 1.000 |
|  |  | Coating thickness | 0.034 | 0.034 | 0.033 | 0.033 | 0.033 | 0.033 | 0.033 |
|  |  | Finished wire external diameter | 1.067 | 1.067 | 1.066 | 1.066 | 1.066 | 1.065 | 1.065 |
|  | External appearance |  | Good | Good | Good | Good | Good | Good | Good |
| Property of insulated wire | Average diameter of pits on surface (μm) |  | 1.8 | 1.5 | 2.1 | 2.0 | 1.2 | 0.8 | 4.9 |
|  | Abrasion resistance | Number of reciprocative abrasions (Cycle) | 1520 | 1130 | 1820 | 1460 | 1430 | 1470 | 1056 |
|  | Slipping property | Static friction coefficient | 0.052 | 0.055 | 0.051 | 0.050 | 0.051 | 0.051 | 0.055 |
|  | Varnish adhesion strength (N) | Epoxy series | 155 | 150 | 162 | 165 | 144 | 125 | 188 |
|  |  | Polyester series | 89 | 85 | 88 | 92 | 79 | 70 | 112 |

TABLE 2

|  |  |  | Comparison Example 1 | Comparison Example 2 | Comparison Example 3 | Comparison Example 4 | Comparison Example 5 | Comparison Example 6 | Comparison Example 7 |
|---|---|---|---|---|---|---|---|---|---|
| Raw materials for insulating coating composition of polyamide-imide resin | Isocyanate component | 4,4'-MDI (Mw = 250) | 255.0 (1.02) | 255.0 (1.02) | 255.0 (1.02) | 255.0 (1.02) | 230.0 (0.92) | 255.0 (1.02) | 255.0 (1.02) |
|  |  | 2,4-TDI (Mw = 174) |  |  |  |  | 17.4 (0.10) |  |  |
|  | Tricarboxylic anhydride | TMA (Mw = 192) | 192.0 (1.00) | 192.0 (1.00) | 192.0 (1.00) | 192.0 (1.00) | 172.8 (0.90) | 192.0 (1.00) | 192.0 (1.00) |
|  | Tetracarboxylic dianhydride | PMDA (Mw = 218) |  |  |  |  | 10.9 (0.05) |  |  |
|  | Dicarboxylic acid component | TPA (Mw = 166) |  |  |  |  | 8.3 (0.05) |  |  |
|  | Blocking agent | Oleyl alcohol (C18) (Mw = 268) |  |  |  |  |  |  |  |
|  |  | Stearyl alcohol (C18) (Mw = 270) |  |  |  |  |  |  |  |
|  |  | Dodecanol (C12) (Mw = 186) |  |  |  |  |  |  |  |
|  |  | Octanol (C8) (Mw = 130) |  |  |  |  |  | 1.3 (0.01) |  |
|  |  | Polyethylene glycol 600 (Mw = 600) |  |  |  |  |  |  |  |
|  |  | Methanol (C1) (Mw = 32) | 0.6 (0.02) |  | 1.6 (0.05) | 0.6 (0.02) |  | 0.6 (0.02) |  |

TABLE 2-continued

|  |  |  | Comparison Example 1 | Comparison Example 2 | Comparison Example 3 | Comparison Example 4 | Comparison Example 5 | Comparison Example 6 | Comparison Example 7 |
|---|---|---|---|---|---|---|---|---|---|
|  |  | Hexanol (C6) (Mw = 102) |  | 2.0 (0.02) |  |  |  |  |  |
|  |  | Butanone oxime (C4) (Mw = 87) |  |  | 1.7 (0.02) |  |  |  |  |
| Lubricant component | Lubricant | Polyolefin series Fatty acid ester series | 8.9 | 8.9 | 8.9 | 11.2 | 8.8 |  | 8.9 |
|  | Additive | Polyisocyanate compound |  |  |  | 111.8 |  |  |  |
|  |  | Epoxy resin |  |  |  |  |  |  |  |
|  |  | Silane coupling agent |  |  |  |  |  |  | 44.7 |
| Solvent |  | NMP | 1100 | 1100 | 1100 | 1200 | 900 | 900 | 1250 |
|  |  | DMF |  |  |  | 200 | 200 | 200 |  |
| Property of insulating coating composition |  | Reduced viscosity (dl/g) | 0.40 | 0.41 | 0.40 | 0.40 | 0.40 | 0.40 | 0.40 |
|  |  | Nonvolatile matter (mass%) | 28.2 | 28.1 | 28.0 | 28.4 | 28.4 | 28.8 | 28.1 |
| Property of insulated wire | Dimensions (mm) | Conductor diameter | 1.000 | 1.000 | 1.000 | 1.000 | 1.000 | 1.000 | 1.000 |
|  |  | Coating thickness | 0.033 | 0.033 | 0.034 | 0.034 | 0.033 | 0.034 | 0.034 |
|  |  | Finished wire external diameter | 1.066 | 1.066 | 1.067 | 1.067 | 1.066 | 1.067 | 1.067 |
|  | External appearance |  | Good No pits | Good No pits | Good No pits | Good No pits | Good No pits | Good | Good |
|  | Average diameter of pits on surface (μm) |  |  |  |  |  |  | 1.1 | 1.5 |
|  | Abrasion resistance | Number of reciprocative abrasions (Cycle) | 1510 | 1462 | 1458 | 1850 | 1800 | 387 | 890 |
|  | Slipping property | Static friction coefficient | 0.052 | 0.050 | 0.051 | 0.050 | 0.051 | 0.132 | 0.081 |
|  | Varnish adhesion strength (N) | Epoxy series | 63 | 59 | 60 | 32 | 62 | 178 | 96 |
|  |  | Polyester series | 30 | 28 | 29 | 15 | 30 | 105 | 69 |

As regards the property of the insulating coating composition listed in Tables 1 and 2, the reduced viscosity (dl/g) and the amount of nonvolatile matter (mass %) were measured.

To evaluate the properties of enamel wires thus prepared, dimension measuring and external appearance examination were conducted according to JIS C 3003 for judgment of good or not acceptable. The average diameter (in μm) of pits formed on the surface of coating layer (the surface of the lubricative layer 13) were calculated with arithmetically averaging diameters of pits observed on the surface of the lubricative layer 13 under a light microscope. The abrasion resistance test was conducted according to JIS C 3003, wherein the sample underwent reciprocative abrasions to measure the number of abrasion cycles until the bare conductor appeared due to wearing down of the coating layer caused by abrasion. Regarding the slipping properties, the static friction coefficient was measured using the incline method. The varnish adhesion strength (in N) was measured in terms of the epoxy series varnish and the polyester series varnish according to NEMA Method.

The following details behaviors of embodiment examples 1 to 14 and comparison examples 1 to 8 listed in Tables 1 and 2.

Embodiment Example 1

MDI (4,4'-diphenylmethane diisocyanate) of 255.0 g (1.02 mol) as the isocyanate component, trimellitic anhydride (TMA) of 192.0 g (1.0 mol) as the acid component, and NMP (N-methyl-2-pyrrolidone) of 1100 g as the solvent were charged and allowed to proceed to a synthetic reaction. Then, oleyl alcohol (carbon number: C18) of 5.4 g (0.02 mol) was charged as the blocking agent to cease the synthetic reaction. Thus, the polyamide-imide resin having 28 mass % of resin concentration was obtained.

Further, polyolefin series lubricant of 8.9 g (2 parts by mass) was dispersed therein as the lubricant to obtain the self-lubricating polyamide-imide resin insulating coating composition.

Embodiment Example 2

MDI of 255.0 g (1.02 mol) as the isocyanate component, TMA of 192.0 g (1.0 mol) as the acid component, and NMP of 1100 g as the solvent were charged and allowed to proceed to a synthetic reaction. Then, oleyl alcohol of 13.4 g (0.05 mol) was charged as the blocking agent to cease the synthetic reaction. Thus, the polyamide-imide resin having 28 mass % of resin concentration was obtained.

Further, polyolefin series lubricant of 8.9 g (2 parts by mass) was dispersed therein as the lubricant to obtain the self-lubricating polyamide-imide resin insulating coating composition.

Embodiment Example 3

MDI of 255.0 g (1.02 mol) as the isocyanate component, TMA of 192.0 g (1.0 mol) as the acid component, and NMP of 1100 g as the solvent were charged and allowed to proceed to a synthetic reaction. Then, oleyl alcohol of 0.8 g (0.003 mol) and methanol (C1) of 0.3 g (0.01 mol) were charged as the blocking agent to cease the synthetic reaction. Thus, the polyamide-imide resin having 28 mass % of resin concentration was obtained.

Further, polyolefin series lubricant of 8.9 g (2 parts by mass) was dispersed therein as the lubricant to obtain the self-lubricating polyamide-imide resin insulating coating composition.

Embodiment Example 4

MDI of 262.5 g (1.05 mol) as the isocyanate component, TMA of 192.0 g (1.0 mol) as the acid component, and NMP of 1100 g as the solvent were charged and allowed to proceed to a synthetic reaction. Then, oleyl alcohol of 5.4 g (0.02 mol) was charged as the blocking agent to cease the synthetic reaction. Thus, the polyamide-imide resin having 28 mass % of resin concentration was obtained.

Further, polyolefin series lubricant of 9.1 g (2 parts by mass) was dispersed therein as the lubricant to obtain the self-lubricating polyamide-imide resin insulating coating composition.

Embodiment Example 5

MDI of 250.0 g (1.0 mol) as the isocyanate component, TMA of 192.0 g (1.0 mol) as the acid component, and NMP of 1100 g as the solvent were charged and allowed to proceed to a synthetic reaction. Then, oleyl alcohol of 5.4 g (0.02 mol) was charged as the blocking agent to cease the synthetic reaction. Thus, the polyamide-imide resin having 28 mass % of resin concentration was obtained.

Further, polyolefin series lubricant of 8.8 g (2 parts by mass) was dispersed therein as the lubricant to obtain the self-lubricating polyamide-imide resin insulating coating composition.

Embodiment Example 6

MDI of 255.0 g (1.02 mol) as the isocyanate component, TMA of 192.0 g (1.0 mop as the acid component, and NMP of 1200 g as the solvent were charged and allowed to proceed to a synthetic reaction until the degree of polymerization reaches 0.5 dl/g in reduced viscosity. Then, oleyl alcohol of 5.4 g (0.02 mol) was charged as the blocking agent to cease the synthetic reaction. Thereafter, the reaction product was diluted with DMF of 200 g to obtain the polyamide-imide resin having 24 mass % of resin concentration.

Further, polyolefin series lubricant of 8.9 g (2 parts by mass) was dispersed therein as the lubricant to obtain the self-lubricating polyamide-imide resin insulating coating composition.

Embodiment Example 7

MDI of 250.0 g (1.02 mol) as the isocyanate component, TMA of 192.0 g (1.0 mol) as the acid component, and NMP of 1200 g as the solvent were charged and allowed to proceed to a synthetic reaction. Then, oleyl alcohol of 5.4 g (0.02 mol) was charged as the blocking agent to cease the synthetic reaction.

Thereafter, the reaction product was cooled to 50° C. and mixed with hexanol (C5) of 5.1 g (0.05 mol). Into the mixed product, polyisocyanate compound of 111.8 g (25 parts by mass) and polyolefin series lubricant of 11.2 g (2 parts by mass) are added as the lubricant component additives, which was followed by agitation and dilution with DMF (N,N-dimethylformamide) of 200 g to obtain the polyamide-imide resin having 28 mass % of resin concentration.

Embodiment Example 8

MDI of 255.0 g (1.02 mol) as the isocyanate component, TMA of 192.0 g (1.0 mol) as the acid component, and NMP of 1000 g as the solvent were charged and allowed to proceed to a synthetic reaction. Then, oleyl alcohol of 5.4 g (0.02 mol) was charged as the blocking agent to cease the synthetic reaction.

Into the reaction product, epoxy resin of 44.7 g (10 parts by mass) was mixed as the abrasion-improving agent (the lubricant component), which was followed by dilution with DMF of 250 g to obtain the polyamide-imide resin having 28 mass % of resin concentration.

Further, polyolefin series lubricant of 8.9 g (2 parts by mass) was charged as the lubricant and agitated to obtain the self-lubricating polyamide-imide resin insulating coating composition.

Embodiment Example 9

MDI of 255.0 g (1.02 mol) as the isocyanate component, TMA of 192.0 g (1.0 mol) as the acid component, and NMP of 1100 g as the solvent were charged and allowed to proceed to a synthetic reaction. Then, oleyl alcohol of 5.4 g (0.02 mol) was charged as the blocking agent to cease the synthetic reaction. Thus, the polyamide-imide resin having 28 mass % of resin concentration was obtained.

Further, fatty acid ester series lubricant of 8.9 g (2 parts by mass) was dispersed therein as the lubricant to obtain the self-lubricating polyamide-imide resin insulating coating composition.

Embodiment Example 10

MDI of 230.0 g (0.92 mol) and TDI (tolylene diisocyanate) of 17.4 g (0.10 mol) as the isocyanate components, TMA of 172.8 g (0.9 mol) and PMDA (tetracarboxylic dianhydride component) of 10.9 g (0.05 mol) and TPA (dicarboxylic acid component) of 8.3 g (0.05 mol) as the acid components, and NMP of 900 g as the solvent were charged and allowed to proceed to a synthetic reaction. Then, oleyl alcohol of 5.4 g (0.02 mol) was charged as the blocking agent to cease the synthetic reaction. Thereafter, the reaction product was diluted with DMF of 200 g to obtain the polyamide-imide resin having 28 mass % of resin concentration.

Further, polyolefin series lubricant of 8.9 g (2 parts by mass) was dispersed therein as the lubricant to obtain the self-lubricating polyamide-imide resin insulating coating composition.

Embodiment Example 11

MDI of 255.0 g (1.02 mol) as the isocyanate component, TMA of 192.0 g (1.0 mol) as the acid component, and NMP of 900 g as the solvent were charged and allowed to proceed to a synthetic reaction. Then, stearyl alcohol (C18) of 5.4 g (0.02 mol) was charged as the blocking agent to cease the synthetic reaction. Thereafter the reaction product was diluted with DMF of 200 g to obtain the polyamide-imide resin having 28 mass % of resin concentration.

Further, polyolefin series lubricant of 8.9 g (2 parts by mass) was dispersed therein as the lubricant to obtain the self-lubricating polyamide-imide resin insulating coating composition.

Embodiment Example 12

MDI of 255.0 g (1.02 mol) as the isocyanate component, TMA of 192.0 g (1.0 mol) as the acid component, and NMP of 900 g as the solvent were charged and allowed to proceed to a synthetic reaction. Then, dodecanol (C12) of 3.7 g (0.02 mol) was charged as the blocking agent to cease the synthetic reaction. Thereafter the reaction product was diluted with DMF of 200 g to obtain the polyamide-imide resin having 28 mass % of resin concentration.

Further, polyolefin series lubricant of 8.9 g (2 parts by mass) was dispersed therein as the lubricant to obtain the self-lubricating polyamide-imide resin insulating coating composition.

Embodiment Example 13)

MDI of 255.0 g (1.02 mol) as the isocyanate component, TMA of 192.0 g (1.0 mol) as the acid component, and NMP of 900 g as the solvent were charged and allowed to proceed to a synthetic reaction. Then, octanol (C8) of 2.6 g (0.02 mol) was charged as the blocking agent to cease the synthetic reaction. Thereafter, the reaction product was diluted with DMF of 200 g to obtain the polyamide-imide resin having 28 mass % of resin concentration.

Further, polyolefin series lubricant of 8.9 g (2 parts by mass) was dispersed therein as the lubricant to obtain the self-lubricating polyamide-imide resin insulating coating composition.

Embodiment Example 14

MDI of 255.0 g (1.02 mol) as the isocyanate component, TMA of 192.0 g (1.0 mol) as the acid component, and NMP of 900 g as the solvent were charged and allowed to proceed to a synthetic reaction. Then, polyethylene glycol 600 (weight-averaged molecular weight: Mw=600) of 12.0 g (0.02 mol) was charged as the blocking agent to cease the synthetic reaction. Thereafter the reaction product was diluted with DMF of 200 g to obtain the polyamide-imide resin having 28 mass % of resin concentration.

Further, polyolefin series lubricant of 8.9 g (2 parts by mass) was dispersed therein as the lubricant to obtain the self-lubricating polyamide-imide resin insulating coating composition.

Comparison Example 1

MDI of 255.0 g (1.02 mol) as the isocyanate component, TMA of 192.0 g (1.0 mol) as the acid component, and NMP of 1100 g as the solvent were charged and allowed to proceed to a synthetic reaction. Then, methanol (C1) of 0.6 g (0.02 mol) was charged as the blocking agent to cease the synthetic reaction. Thus, the polyamide-imide resin having 28 mass % of resin concentration was obtained.

Further, polyolefin series lubricant of 8.9 g (2 parts by mass) was dispersed therein as the lubricant to obtain the self-lubricating polyamide-imide resin insulating coating composition.

Comparison Example 2

MDI of 255.0 g (1.02 mol) as the isocyanate component, TMA of 192.0 g (1.0 mol) as the acid component, and NMP of 1100 g as the solvent were charged and allowed to proceed to a synthetic reaction. Then, hexanol (C6) of 2.0 g (0.02 mol) was charged as the blocking agent to cease the synthetic reaction. Thus, the polyamide-imide resin having 28 mass % of resin concentration was obtained.

Further, polyolefin series lubricant of 8.9 g (2 parts by mass) was dispersed therein as the lubricant to obtain the self-lubricating polyamide-imide resin insulating coating composition.

Comparison Example 3

MDI of 255.0 g (1.02 mol) as the isocyanate component, TMA of 192.0 g (1.0 mol) as the acid component, and NMP of 1100 g as the solvent were charged and allowed to proceed to a synthetic reaction. Then, butanone oxime (C6) of 1.7 g (0.02 mol) was charged as the blocking agent to cease the synthetic reaction. Thus, the polyamide-imide resin having 28 mass % of resin concentration was obtained.

Further, polyolefin series lubricant of 8.9 g (2 parts by mass) was dispersed therein as the lubricant to obtain the self-lubricating polyamide-imide resin insulating coating composition.

Comparison Example 4

MDI of 255.0 g (1.02 mol) as the isocyanate component, TMA of 192.0 g (1.0 mol) as the acid component, and NMP of 1200 g as the solvent were charged and allowed to proceed to a synthetic reaction. Then, methanol (C1) of 0.6 g (0.02 mol) was charged as the blocking agent to cease the synthetic reaction.

Thereafter, the reaction product was cooled to 50° C. and mixed with methanol of 1.0 g (0.03 mol). Into the mixed product, polyisocyanate compound of 111.8 g (25 parts by mass) and polyolefin series lubricant of 11.2 g (2 parts by mass) are added as the lubricant component additives, which was followed by agitation and dilution with DMF of 200 g to obtain the polyamide-imide resin having 28 mass % of resin concentration.

Comparison Example 5

MDI of 230.0 g (0.92 mol) and TDI of 17.4 g (0.10 mol) as the isocyanate components; TMA of 172.8 g (0.9 mol), PMDA of 10.9 g (0.05 mol), and TPA of 8.3 g (0.05 mol) as the acid components; and NMP of 900 g as the solvent were charged and allowed to proceed to a synthetic reaction. Then, methanol (C1) of 0.6 g (0.02 mol) was charged as the blocking agent to cease the synthetic reaction. Thereafter, the reaction product was diluted with DMF of 200 g to obtain the polyamide-imide resin having 28 mass % of resin concentration.

Further, polyolefin series lubricant of 8.8 g (2 parts by mass) was dispersed therein as the lubricant to obtain the self-lubricating polyamide-imide resin insulating coating composition.

Comparison Example 6

MDI of 255.0 g (1.02 mol) as the isocyanate component, TMA of 192.0 g (1.0 mol) as the acid component, and NMP of 900 g as the solvent were charged and allowed to proceed to a synthetic reaction. Then, octanol of 1.3 g (0.01 mol) was charged as the blocking agent to cease the synthetic reaction. Thereafter, the reaction product was diluted with DMF of 200 g to obtain the polyamide-imide resin having 28 mass % of resin concentration.

Comparison Example 7

MDI of 255.0 g (1.02 mol) as the isocyanate component, TMA of 192.0 g (1.0 mol) as the acid component, and NMP of 1100 g as the solvent were charged and allowed to proceed to a synthetic reaction. Then, methanol (C1) of 0.6 g (0.02 mol) was charged as the blocking agent to cease the synthetic reaction. Thus, the polyamide-imide resin having 28 mass % of resin concentration was obtained.

Further, polyolefin series lubricant of 8.9 g (2 parts by mass) as the lubricant and silane coupling agent of 44.7 g were charged therein to obtain the self-lubricating polyamide-imide resin insulating coating composition.

In the above-listed examples, each of the embodiment examples underwent the terminating of the synthetic reaction rendered by capping isocyanate group with higher alcohol and pits of 0.8 to 4.9 μm in diameter were observed on the surface of enamel wires. The sizes of the pits vary depending on such as the type of higher alcohol, adding amount, base resin, and additives. However, when the size is within the pit diameter range as listed in the embodiments, the varnish adhesion strength can be improved without reduction of abrasion resistance or slipping properties.

Embodiment examples 1 to 6, 8, 9, and 11 to 14 are self-lubricating polyamide-imide resin insulating coating composition that uses polyamide-imide resin as a base resin. The base resin has undergone reaction termination by capping with oleyl alcohol having a carbon number of 8 or more used as a blocking agent and has a lubricant dispersed therein. As can be known from the table, these have a good performance balance in the varnish adhesion strength with lubricity of the insulating coating (slipping properties). In other words, the embodiment examples have attained improved lubricity of the insulating coating without reduction of the varnish adhesion strength. Although the number of reciprocative abrasions of the insulated wire in above-stated examples is about 1300 cycles and the number of cycles has a tendency to decrease slightly as the diameter of pit becomes larger, the decrease is within acceptable extent in a practical view. In embodiment example 7, lubricant and additives are dispersed therein after mixing hexanol (C6) into the reaction product in which the synthetic reaction was ceased, and a more improved number of reciprocative abrasions of 1840 cycles is attained. In embodiment example 10, TDI is added in addition to MDI as the isocyanate component, and PMID and TPA are added besides TMA as the acid component. Thereby, more improved number of reciprocative abrasions of 1820 cycles is attained.

In contrast to these embodiment examples 1 to 14, the synthetic reaction in comparison examples 1 to 5 and 7 was terminated by capping isocyanate group with lower alcohol having a carbon number of less than eight. In these comparison examples therefore, no pits were observed and the varnish adhesion strengths were very low. This means that the blocking agent should use higher alcohol having a carbon number of eight or more.

The use of higher alcohol, unless its dose is proper, will produce pits having too large size with poor abrasion resistance or no pits having observable size. That is, when oleyl alcohol is added in an amount as much as 0.08 mol, which is four times the redundant amount of MDI (0.02 mol) beyond the amount of TDI, the external appearance is milky and the abrasion resistance is poor, although the varnish adhesion strength is high.

These mean that the preferable adding amount of the blocking agents is basically a larger amount within the range from the equimolar amount with the redundant amount to the amount four times the redundant amount. Where alcohol having a carbon number of not more than eight is used in combination therewith, an underdose amount, as shown in embodiment example 3, may be practicable.

Comparison example 4 has, similarly to embodiment examples 7 and 8, such a composition that the abrasion resistance is enhanced by the use of polyisocyanate compound and epoxy resin. However, the varnish adhesion strength is largely reduced because higher alcohol having a carbon number of eight or more is not used.

Comparison example 6 uses octanol having a carbon number of eight as the blocking agent with such varnish adhesion strength as is comparable to those in the embodiment examples. However, the abrasion resistance and slipping properties are all poor because the lubricant is not added. In comparison example 8, silane coupling agent is added as the lubricant component besides a lubricant. However, the abrasion resistance, slipping properties, and varnish adhesion strength are all unsatisfactory because higher alcohol is not used.

The invention claimed is:

1. An insulated wire having a lubricative layer formed by applying an insulating coating composition comprised of a polyamide-imide resin on the periphery of a conductor of said wire, wherein said polyamide-imide resin is obtained by a synthetic reaction of isocyanate component with acid component, and a lubricant component,
   wherein the polyamide-imide resin has its terminal group comprising an isocyanate group which is capped with a blocking agent, and
   wherein the blocking agent comprises a higher alcohol having a carbon number of eight or more but not more than eighteen.

2. The insulated wire according to claim 1, wherein a surface of said lubricative layer has a pit having a diameter of not smaller than 0.1 μm but not larger than 5 μm.

3. A coil formed by winding said insulated wire according to claim 1, wherein a surface of said coil is impregnated with varnish and then said varnish is cured.

4. The insulated wire according to claim 1, wherein the higher alcohol is one of stearyl alcohol, oleyl alcohol, dodecanol and octanol.

5. The insulated wire according to claim 1, wherein the blocking agent is added in a molar amount within a range from not less than 0.3 mol % to less than 5 mol % of the molar amount of the isocyanate component.

* * * * *